United States Patent
Derleth et al.

(10) Patent No.: US 6,234,569 B1
(45) Date of Patent: May 22, 2001

(54) SUBASSEMBLY FOR A COCKPIT OF A MOTOR VEHICLE

(75) Inventors: Martin Derleth, Schonungen; Guenter Ebner, Korntal-Muenchingen; Sabine Neuss, Freiberg/Neckar; Walter Wolf, Oppenweiler-Zell, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/448,428

(22) Filed: Nov. 24, 1999

(30) Foreign Application Priority Data

Nov. 27, 1998 (DE) ............................................. 198 54 940

(51) Int. Cl.⁷ ...................................................... B60J 7/00
(52) U.S. Cl. .............................. 296/208; 296/70; 296/72; 296/192; 280/779
(58) Field of Search ................................ 296/70, 72, 208, 296/192; 280/779

(56) References Cited

U.S. PATENT DOCUMENTS

| | | | |
|---|---|---|---|
| 5,311,960 | * 5/1994 | Kukainis et al. | 296/70 |
| 5,387,023 | * 2/1995 | Deneau | 296/196 |
| 5,556,153 | * 9/1996 | Kelman et al. | 296/192 |
| 5,564,515 | * 10/1996 | Schambre | 296/70 |
| 5,673,964 | * 10/1997 | Roan et al. | 296/194 |
| 5,676,216 | * 10/1997 | Palma et al. | 296/70 |
| 5,678,877 | * 10/1997 | Nishijims et al. | 296/208 |
| 5,685,598 | * 11/1997 | Inoue et al. | 296/70 |
| 5,709,601 | * 1/1998 | Heck | 296/70 |
| 5,762,395 | * 6/1998 | Merrifield et al. | 296/208 |
| 5,823,602 | * 10/1998 | Kelman et al. | 296/70 |
| 5,883,777 | * 3/1999 | Nishitani et al. | 296/70 |
| 5,934,744 | * 8/1999 | Jergens et al. | 296/70 |
| 5,938,266 | 8/1999 | Dauvergne et al. . | |
| 5,979,965 | * 4/1999 | Nishijima et al. | 296/70 |

FOREIGN PATENT DOCUMENTS 197 14 051
A1   10/1997 (DE) .
WO 98/49024   11/1998 (WO) .

* cited by examiner

Primary Examiner—Joseph D. Pape
Assistant Examiner—Kiran Patel
(74) Attorney, Agent, or Firm—Foley & Lardner (57) ABSTRACT

The invention relates to a subassembly for a cockpit of a motor vehicle, having a heating or air-conditioning housing which is arranged in the center console and has at least two housing parts and at least one air guide duct for guiding air at a controlled temperature to air outlet openings arranged in the cockpit. The subassembly includes a T-shaped structural unit, on which a large number of functional components of the cockpit can be mounted formed from an air guide duct having a shell-like duct component and the housing. The shell-like duct component can be covered to form the air guide duct. The present invention further relates to a method of producing the subassembly.

27 Claims, 9 Drawing Sheets

SUBASSEMBLY FOR A COCKPIT OF A MOTOR VEHICLE

BACKGROUND OF THE INVENTION

1. Field of the Invention

The present invention relates to a subassembly for a cockpit of a motor vehicle. The present invention also relates to a method of producing a subassembly for a cockpit of a motor vehicle.

2. Description of the Related Art

German Patent document DE 197 53 877 discloses a cockpit for motor vehicles having an air-conditioning system arranged in the area of the center console and underneath a crossmember, with the crossmember serving as an air guide duct. For this purpose, the crossmember is formed of a hollow design and has dividing walls to feed the air to the different air outlet openings, namely the defrost outlet, side outlets and center outlet. The complete integration of the crossmember into the cockpit and air-conditioning system has a number of disadvantages. A crossmember of this type must have a very complicated shape, since it must have dividing walls which are shaped and arranged aerodynamically in order to guide the air from the air-conditioning system to the outlets without a major pressure loss. For example during the development of the vehicle model, or in the event of a model change to the vehicle, it may be necessary to change the air-conditioning system and the air guides may therefore need to be changed. Thus, the internal construction of the crossmember would have to be adapted to the new air-conditioning system which could involve complicated modifications. The crossmember must also be shaped with an aesthetic form, since the outlet openings are visible from the interior of the vehicle. Crossmembers, which typically extend between the A columns of a motor vehicle and hold the cockpit, are generally formed of metal because of its rigidity. Since the metal crossmember conducts heat well, during the feed of warm air in the winter and cool air in the summer into the interior of the vehicle, in the German Patent, the crossmember first has its temperature controlled and only then does air at the desired temperature emerge from the crossmember into the vehicle cavity. Also, condensation of humidity in the crossmember can occur in hot and moist climatic zones, which is undesirable and may lead to corrosion and unpleasant odors due to the formation of bacteria. Overall, the air-conditioning system of the German Patent cannot be fabricated without the crossmember on the vehicle side.

European Patent No. 713,798 discloses a dashboard arrangement which includes three main components: an air-conditioning system which is open toward the top, a shell-like component which forms the upwardly open air guide ducts from the air-conditioning system to side outlets, center outlets and the defrost outlet, and a decorative part, visible from the interior of the vehicle, which closes the open top of the air-conditioning system and air guide ducts. The European Patent relates to the combination of air-conditioning system and air guidance system with the decorative covering. The air-conditioning system and the air guide paths are determined by the design of the covering decorative part such that the functioning of the air-conditioning system and the design of the dashboard must be changed or coordinated together. It may then occur that, because of design configurations, the air-conditioning system may operate inadequately. Furthermore, this arrangement can only function as an air-conditioning unit.

SUMMARY OF THE INVENTION

An object of the invention is to overcome the disadvantages of the known art. Another object of the invention is to provide an improved subassembly for a cockpit of a motor vehicle which can be produced simply and cost-effectively. The subassembly according to the invention has as few parts as possible and permits, in particular, the heating or air-conditioning system to be coordinated to the greatest possible extent without having to take into account other predefinitions, such as, for example, the specific vehicle design. Yet another object of the invention is to provide a method of producing the subassembly for a cockpit. The forgoing objects and other objects will be readily apparent to those skilled in the art and can be achieved in accordance with the present invention as described herein.

The design of the cockpit can be made irrespective of the functions of the cockpit, which are predefined by the functional components, by simply covering a T-shaped component with the decorative parts configured from an aesthetic point of view. In this way, the formation of various cockpits for different vehicles can be carried out with changes to the particular design needed only very late in the production process and due primarily to the interior design of the vehicle. By using the subassembly according to the invention, standardization in the production of cockpits can be achieved, by which costs can be saved, since it is not necessary at each design change, to redesign and coordinate the functional components of the heating or air-conditioning system with the associated air paths.

In a first embodiment of the present invention, the subassembly includes at least one air guide duct that has a shell-like duct component which can be covered to form the air guide duct. The housing of a heating or air-conditioning system and the shell-like duct component form a T-shaped structural unit, on which a large number of functional components of the cockpit, such as, for example, an operating device of the heating or air-conditioning system; audio and/or visual devices, such as a sound system or navigation device; air outlet nozzles; instrumentation devices; a steering column; an airbag; storage compartments, or the like can be mounted. The present invention achieves the integration of these functional units into a structural unit, which has a considerable cost-reducing effect, thereby reducing the need for multiple parts and improving the logistics of cockpit design. Furthermore, as a result of the integration of the functional components on or in the structural unit, an optimum separation between the functional requirements and the design/configuration requirements of the cockpit is obtained.

It yet another embodiment of the invention, a first of at least two housing parts of the heating or air-conditioning housing is formed to be in a single piece with the shell-like duct component, such that the first housing part can be produced cost-effectively with the shell-like duct part combined to form a T-shaped structural unit. A second housing part is then used to close the heating or air-conditioning system housing.

In another embodiment of the invention, a parting plane between the first and second housing parts extends in such a way that the second housing part can be separated from the first housing part in the direction of the interior of the vehicle. In this way, the components of the heating or air-conditioning system can be easily reached for repair or maintenance purposes after the cockpit is installed in a vehicle. In another embodiment of the invention, the parting plane is designed in such a way that the second housing part forms a bottom pan of the housing.

In another aspect of the invention, the housing parts are preferably held together and reinforced by antivibration struts, which connect to a crossmember to the vehicle floor.

In a further embodiment, the parting plane can be arranged in such a way that the parting plane divides the T-shaped structural unit into two structural unit halves, each half having a housing half and a channel component half connected thereto in one piece. The T-shaped structural unit, or its parts, may be formed of any suitable material, but preferably are formed of plastic and are produced by an injection-molding process.

In another aspect of the invention, the T-shaped structural unit has a large number of areas to hold a wide range of functional components, such as, for example, an operating device of the heating or air-conditioning system, a radio, a navigation device, an airbag, or instruments, such as speedometer or other vehicle monitoring gauges. According to this embodiment, the T-shaped structural unit includes at least one crossmember holder to connect the T-shaped member to a crossmember. In a preferred embodiment, the crossmember holder is arranged approximately at the center of the T-shaped structural unit in the area of the center console. The functional components of the vehicle may be mounted on the T-shaped component first and checked to determine they are functioning properly then, if necessary, coordinated.

In yet another embodiment of the invention, the shell-like duct component can be fixed at the ends at which the side outlets are located to stabilize the unit, including the T-shaped structural unit and crossmember. The shell-like duct component, i.e., the top of the T-shaped structural unit, can be subsequently covered by a first decorative part and the heating or air-conditioning system may be arranged in the area of the center console and covered by a second decorative part to form a complete cockpit, which may have further components, such as a storage compartment, for example.

Another aspect of the present invention is to provide a method of producing the subassembly for a cockpit which includes forming a first housing part and a shell-like duct component connected thereto in a single piece, fitting the crossmember to a mounting frame, inserting heat exchangers, air guide flaps and other components of the heating or air-conditioning system into the first housing part and forming the T-shaped structural unit by connecting the second housing part to the first housing part. Antivibration struts are then mounted to the T-shaped structural unit and any further desired functional components may be fitted to the T-shaped structural unit. The functional components may then be tested and calibrated.

In yet another embodiment, the subassembly may be hooked into a mounting frame at the beginning of the mounting process by a crossmember, which has already been fitted to the first housing part directly following the injection molding of the duct component. The structural unit is held securely in the frame and can be brought into a position most beneficial for the fitting of any further components. Following mounting on the structural unit, all the functions can be checked for their correct functioning. The heating or air-conditioning system contained can be set and tuned. By using the methods according to the invention, therefore, a fully functional and checked cockpit, including all the functional components, can be rapidly and efficiently produced.

The above and other advantages and features of the invention will be more clearly understood from the following detailed description which is provided in connection with the accompanying drawings.

DETAILED DESCRIPTION OF THE PREFERRED EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that changes may be made without departing from the spirit and scope of the present invention.

Reference is now made to the figures. A subassembly 10 for a cockpit of a motor vehicle 12 has, as a main constituent, a T-shaped structural unit 14 on which a large number of functional components of the cockpit 12 can be mounted, as described in detail below. The T-shaped unit 14 may be formed of any suitable material; preferably the T-shaped member 14 is formed of plastic and is produced by an injection-molding process. However, it should be understood that the T-shaped member 14 may be formed by any other known process, such as, for example, a blow-molding process.

The T-shaped structural unit 14 includes a first housing part 18 of housing 19. The housing 19 is part of heating or air-conditioning system 20, which is arranged in the area of the center console of the motor vehicle (FIGS. 4 to 9). The housing 19 of the heating or air-conditioning system 20 is completed by a second housing part 22, which in the exemplary embodiment according to FIGS. 4 and 5, can be separated from the first housing part in the direction of the interior of the vehicle. The air-conditioning system 20 includes a radial fan arranged in fan housing 24, an evaporator 26, air mixing flaps 28, 30, radiator 32 and air distribution flaps 34, 36, 38, to distribute the temperature-controlled air to various air outlets as illustrated in FIG. 5.

The air-conditioning system 20 has an air outlet 40, from which air for the right-hand side of a rear compartment flows, an air outlet 42 for the left-hand side of the rear compartment, an air outlet 44 for the right-hand side footwell, an air outlet 46 for the left-hand side footwell. The air-conditioning system 20 further can have an air outlet 48 for the center outlet 49. The air-conditioning system 20 may also include a defrost-air outlet 50 (FIG. 6) for which air is blown from the air-conditioning system 20 onto a windshield. An air outlet 52 is provided from which air can be fed, via an air guide duct 54, to side outlet 56 on the left-hand side and to side outlet 58 on the right-hand side.

The air duct 54, which extends over the complete width of the subassembly 14 and, respectively, of the cockpit 12, is formed by a shell-like duct component 16, which is produced from plastic in a single piece with the first housing part 18 in an injection-molding process or other suitable process. A first decorative part 60, which covers at least the complete top of the subassembly 14 and closes the shell-like duct component 16 at the top, forms the air duct 54.

Figure 3:
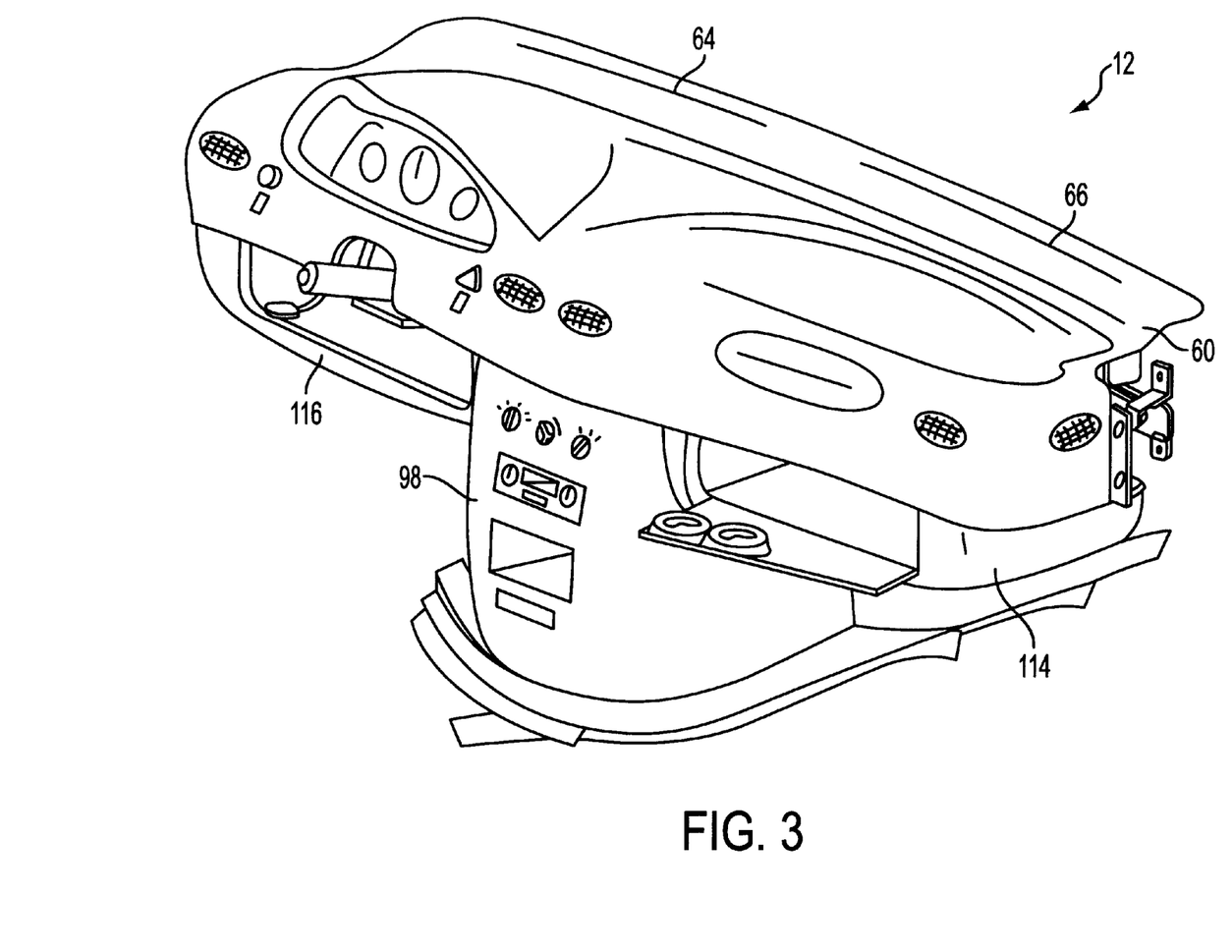
FIG. 3 shows the cockpit from FIG. 2 in the assembled state.

Arranged substantially parallel to the air duct 54 is a further air duct 62 (FIG. 6), which guides the air from the defrost-air outlet 50 to defrost-air outlets 64, 66 arranged in the decorative part 60 (FIG. 3). The air ducts 54 and 62 are formed by the shell-like duct component 16 having a dividing wall 68 which extends vertically as far as an underside of the first decorative part 60. In the exemplary embodiment illustrated in FIG. 6, the dividing wall 68 has a low height on the shell-like duct 16 and is completed by a dividing wall section (not illustrated) on the underside of the first decorative part 60.

Figure 4:
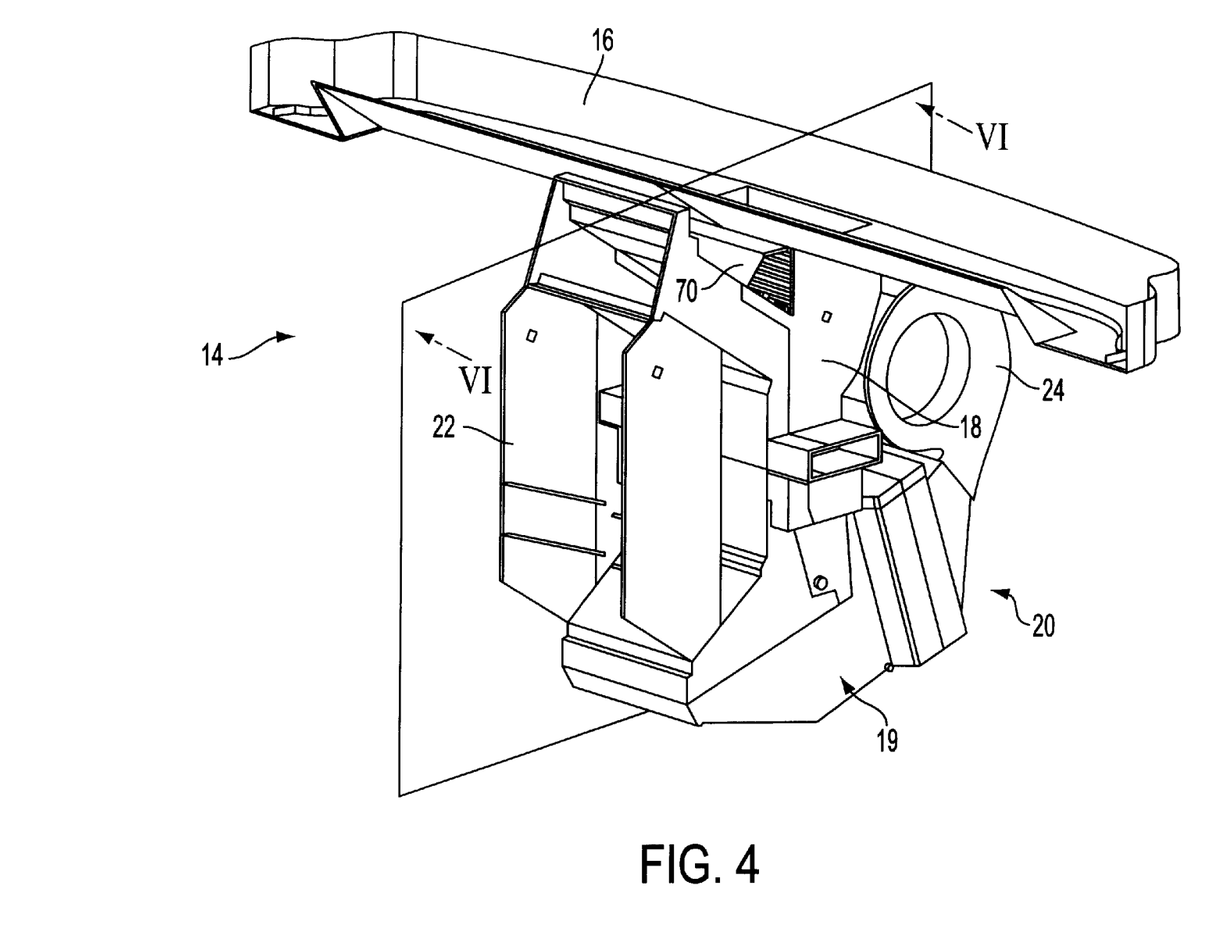
FIG. 4 shows a T-shaped structural unit of the subassembly according to the invention containing an air-conditioning unit.
Figure 5:
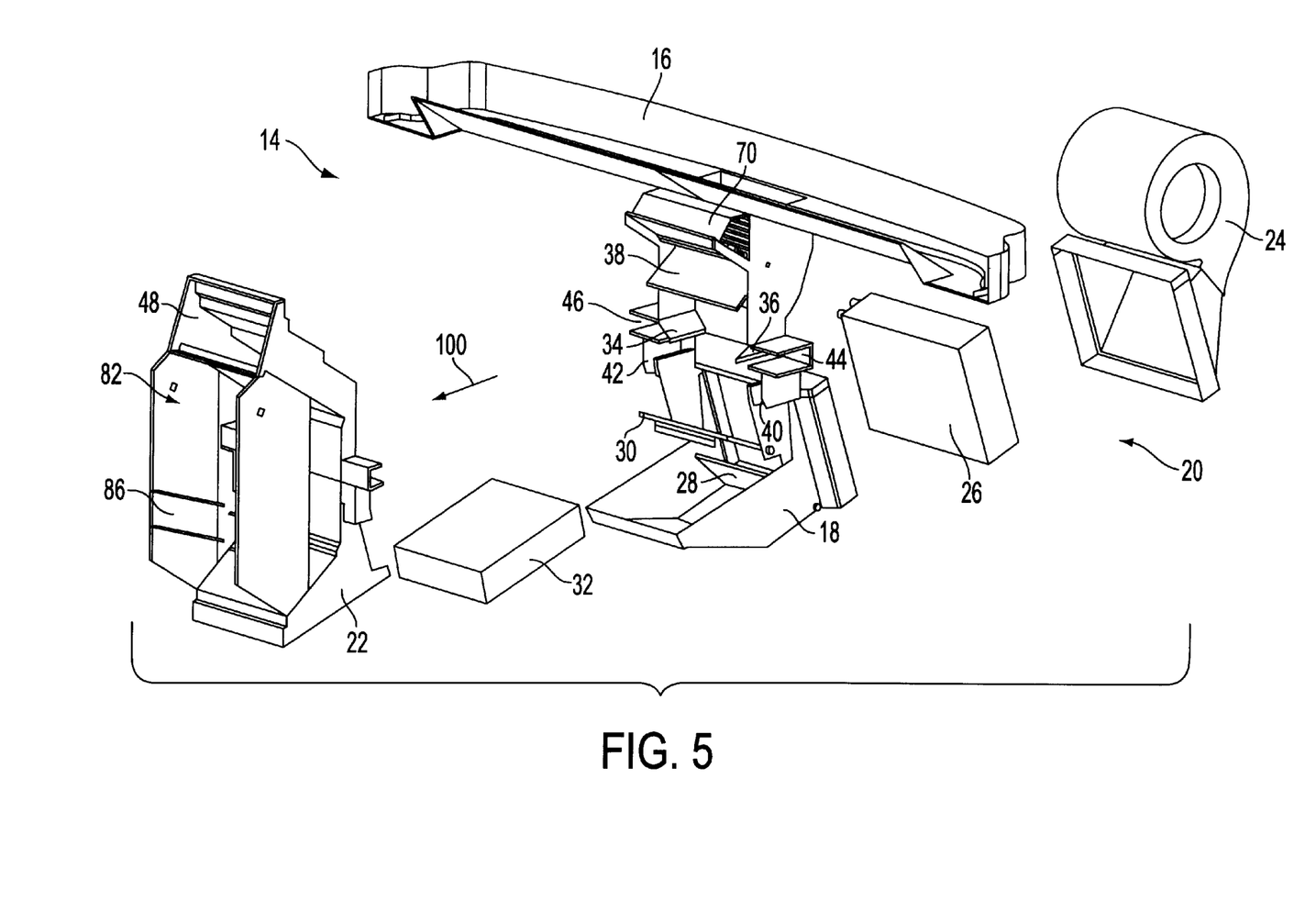
FIG. 5 shows an exploded illustration of the structural unit from FIG. 4.
Figure 6:
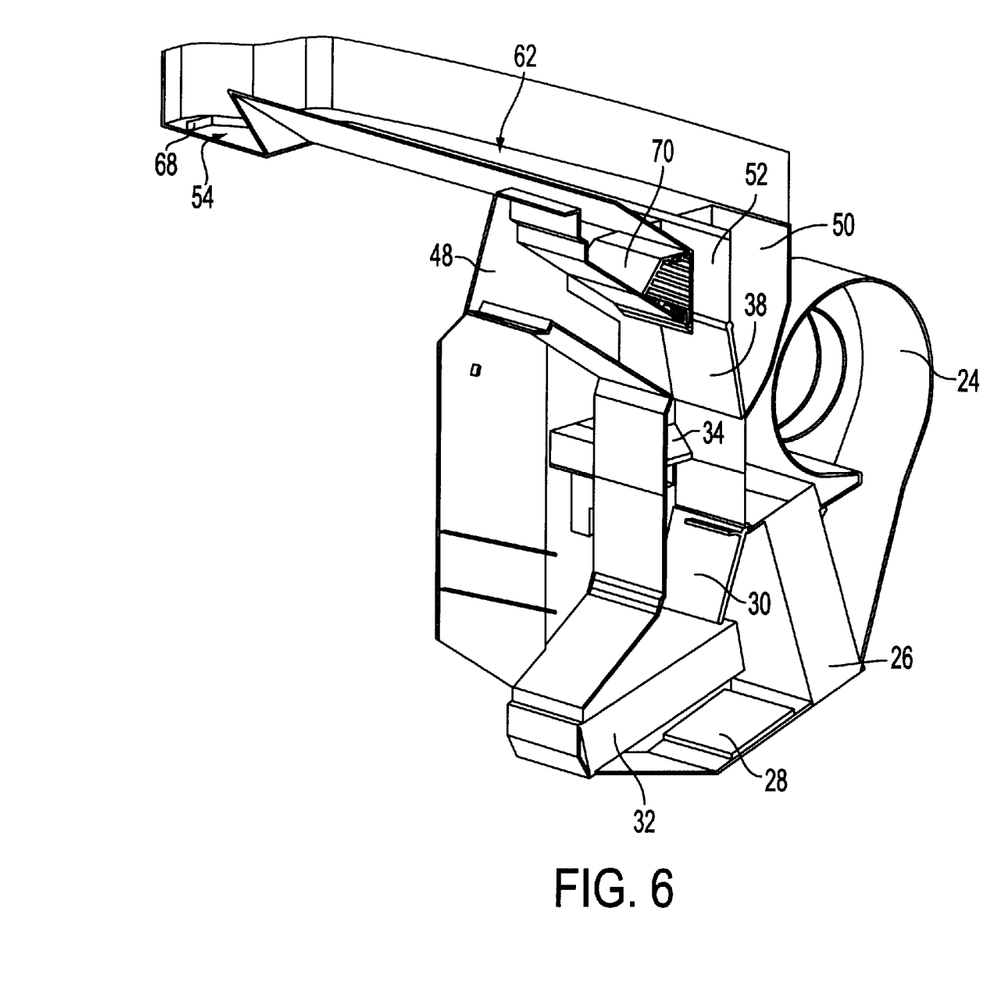
FIG. 6 shows a view of the structural unit from FIG. 4 cut open along the line VI—VI.

As can be seen in FIGS. 4 and 5, the housing 19 of the air-conditioning system 20, and the duct component 16, injection-molded in one piece with the first housing part 18, form the T-shaped structural unit 14.

Figure 1:
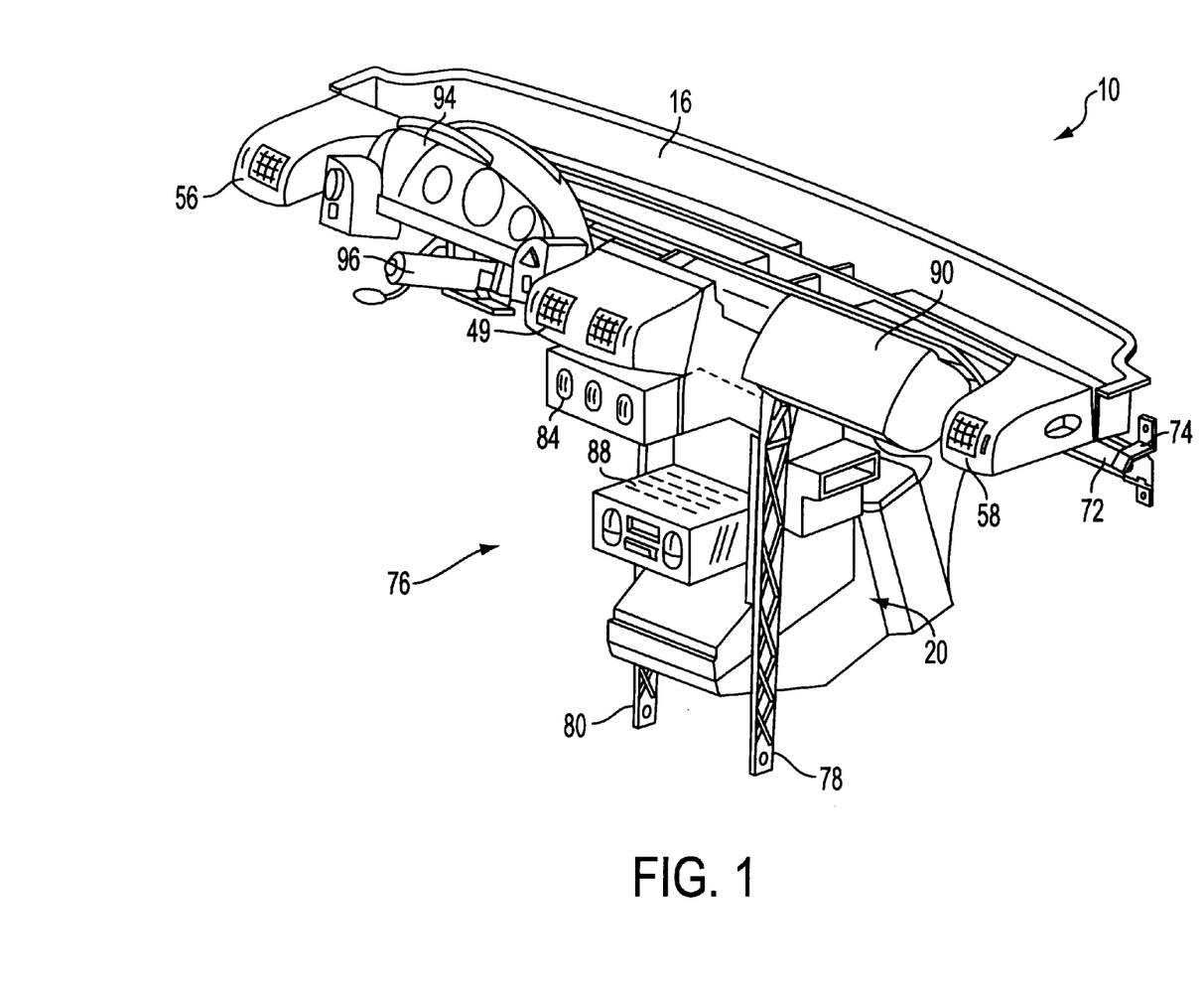
FIG. 1 shows a subassembly according to one embodiment of the invention with functional components mounted thereon.

Referring now to FIG. 1, between air outlet 52 and air outlet 48, the T-shaped structural unit 14 has a crossmember holder 70 to hold a crossmember 72, which extends through the air-conditioning system 20. The crossmember 72 can be fixed to the A columns of the motor vehicle by fastening shoes 74. In the area of a center console 76, which is formed by the housing of the air-conditioning system 20, antivibration struts 78 and 80 are arranged on the opposite sides of the air-conditioning system 20 and, when installed, connect the member 72 to a vehicle floor. In the configuration according to the invention, the antivibration struts 78 and 80 are preferably also fastened to the first and second housing part 18 and 22, such that the housing parts 18 and 22 are connected to each other via the antivibration struts 78 and 80, thereby reinforcing the assembly. In one refinement of the invention, the shell-like duct component 16 can optionally be attached to the crossmember 72 by its free ends, in the areas of which the side outlets 56 and 58 are located.

The second housing part 22 has a holder 82 for an operating device 84 of the air-conditioning system 20 and a holder 86 for an audio/visual system, for example a radio 88 or a navigation device. A holder for an airbag system 90 may also be provided. In addition, the shell-like duct component 16 of the T-shaped structural unit 14 and/or the crossmember 72 has a means 92 for fastening of instruments 94, such as a speedometer, tank indicator or the like, and for attaching an outer tube 96 of a steering system. The means 92 may be any conventional fastening means known to the person having ordinary skill in the art.

Figure 2:
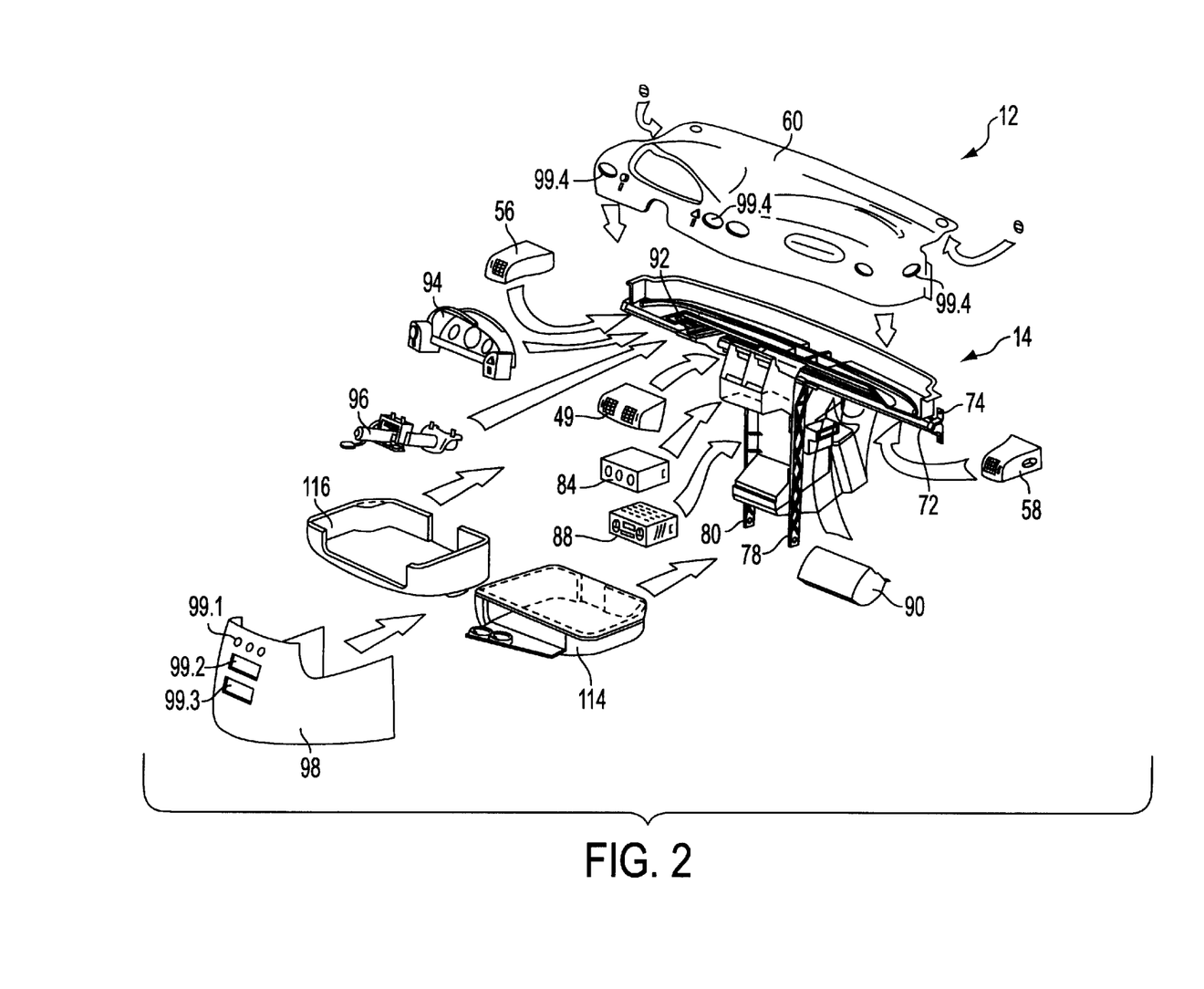
FIG. 2 shows an exploded illustration of a cockpit with the subassembly from FIG. 1.

The subassembly 10, completed by the addition of functional components 56, 58, 84, 88, 90, 94, 96, forms the central element of the cockpit 12. The cockpit 12 is finished by the decorative part 60 which, inter alia, as already described, closes the shell-like duct component 16 at the top, so that the air guide ducts 54 and 62 are formed. Additionally, decorative part 98, which covers the center console formed by the housing of the air-conditioning system 20 may be added. The decorative parts 60 and 98 are designed to be visually pleasing and correspond to a preferred design. The decorative parts 60, 98 have openings 93, 95, 97 and 99 therein for control devices. For example, in the assembled state, operating knobs of the operating device 84 project through the openings 93, the radio and the navigation device are visible and can be operated through the openings 95 and 97, and the openings 99 are filled by the center outlet 49 and the side air outlets 56 and 58.

Figure 7:
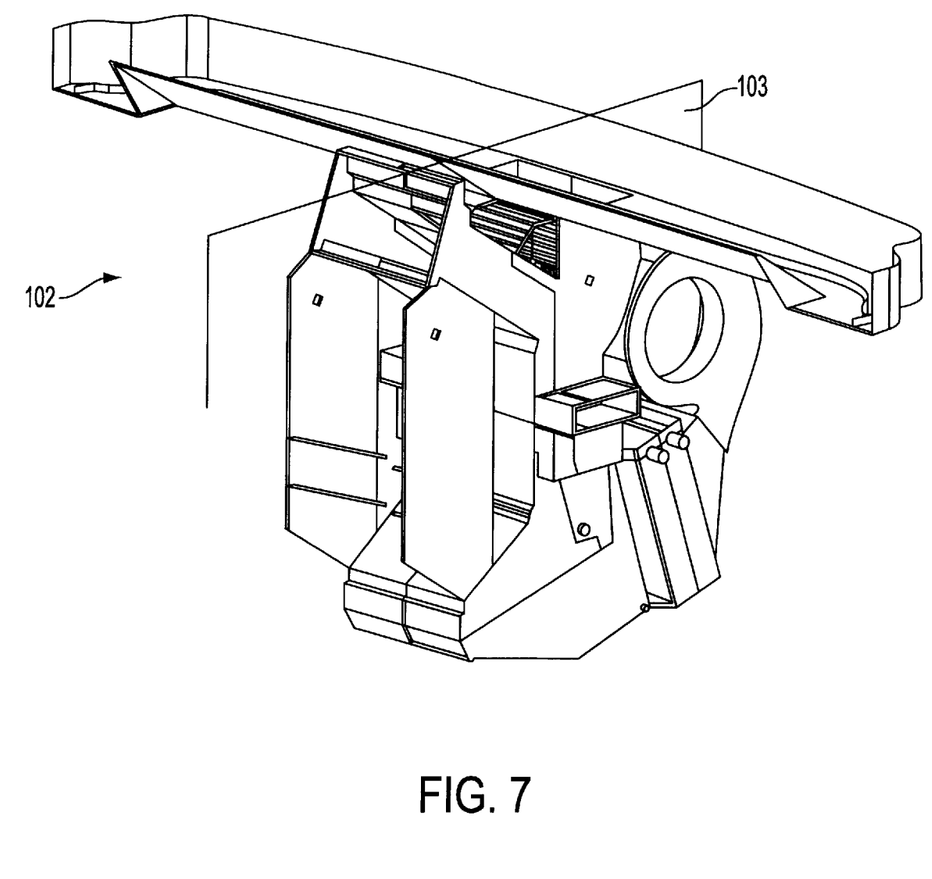
FIG. 7 shows a second embodiment of the T-shaped structural unit with air-conditioning system, the parting plane extending along the line VI—VI from FIG. 4.
Figure 8:
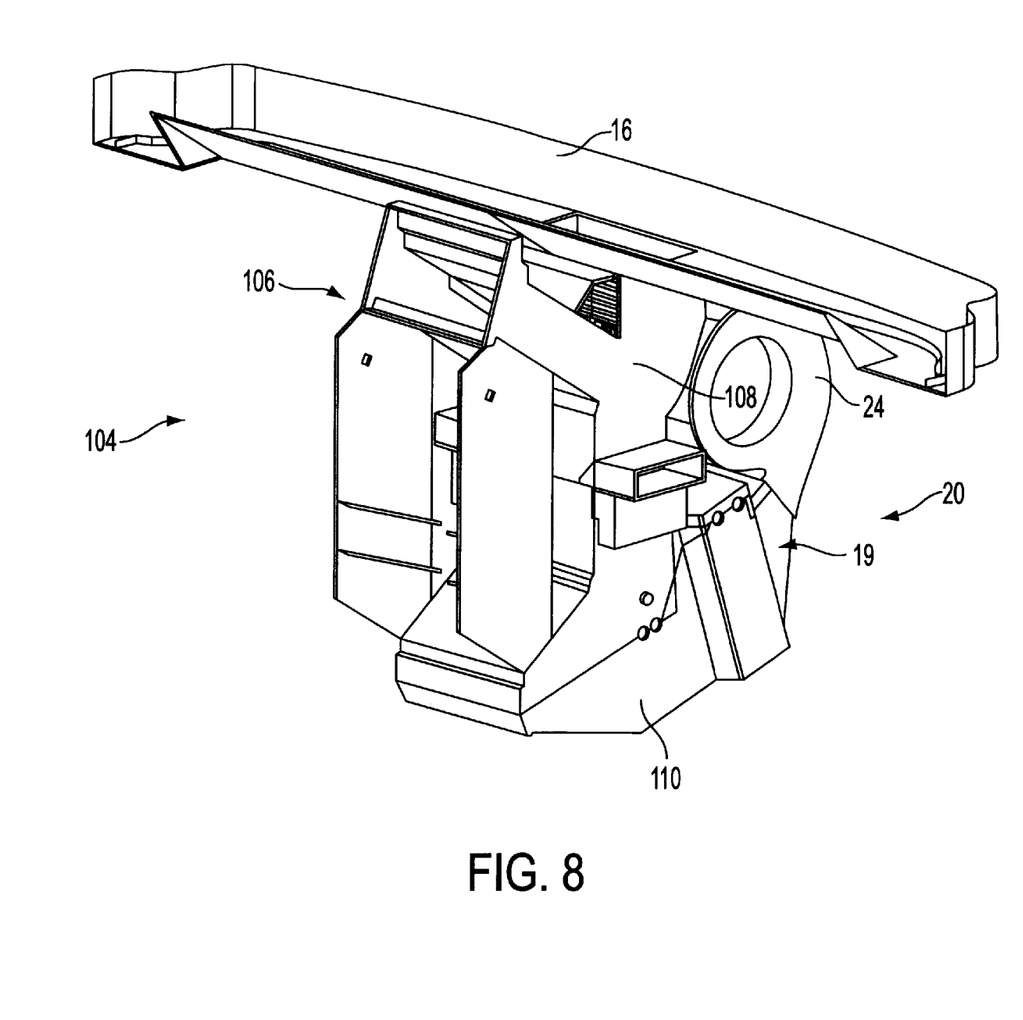
FIG. 8 shows a further embodiment of the T-shaped structural unit with air-conditioning system.
Figure 9:
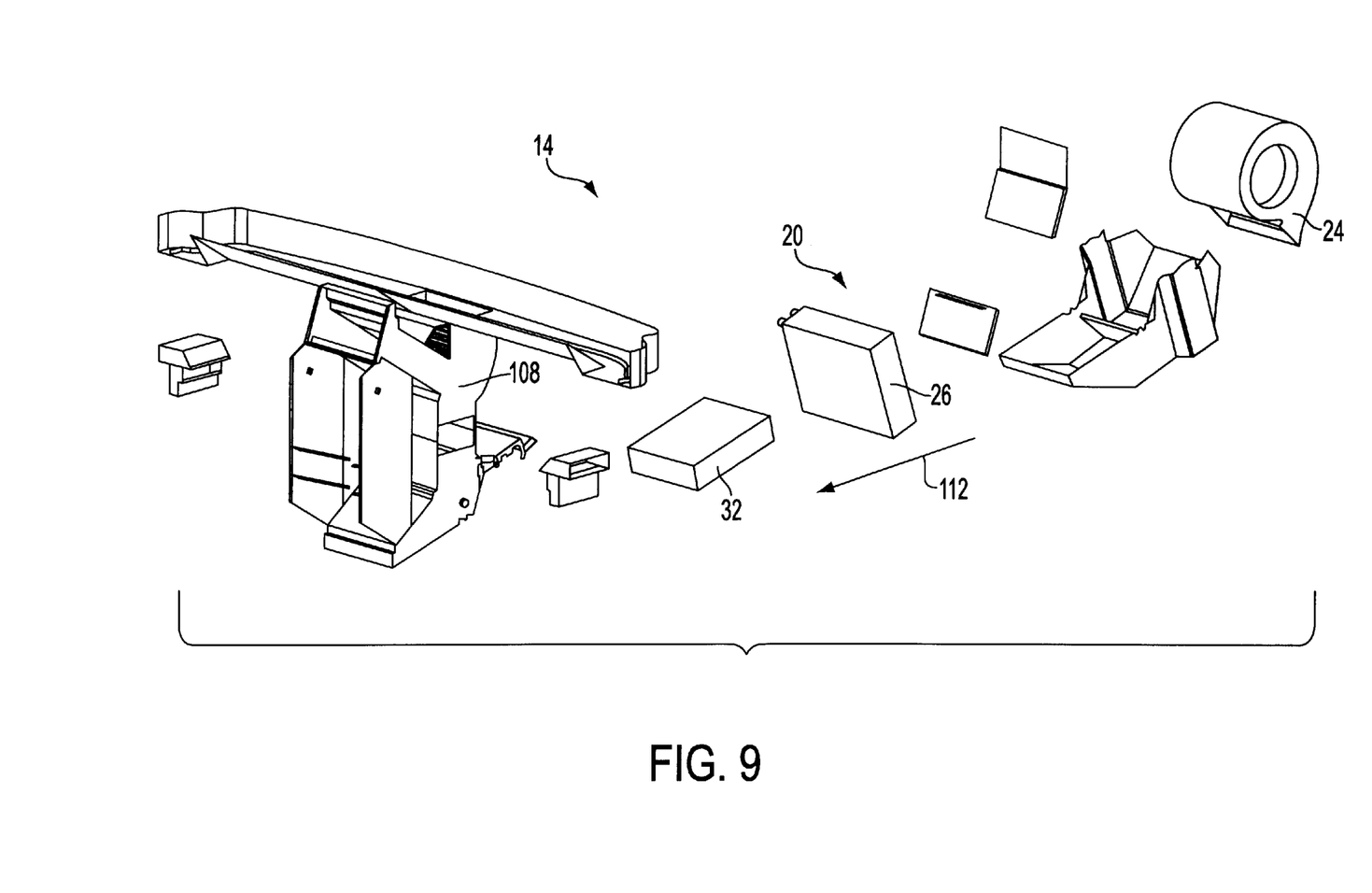
FIG. 9 shows an exploded illustration of the structural unit from FIG. 8.

Reference is now made to FIGS. 7–8. In the exemplary embodiment described above, the T-shaped structural unit 14 has a parting plane designed in such a way that the second housing part 20 could be removed from the first housing part 18 in the direction 100. However, additional parting planes are contemplated by the present invention, which make it possible to produce the housing of the air-conditioning system 20 and the duct part 16 connected thereto in only two pieces. According to the exemplary embodiment from FIG. 7, the structural unit 102 depicted has a parting plane 103 which corresponds to the section plane VI—VI from FIG. 4. In a further exemplary embodiment, which is illustrated in FIG. 8, the first housing part, which can be injection-molded into a single piece with the duct component 16, forms an upper part 108 of the housing 19 of the air-conditioning system 20. The second housing part 110 is designed in the form of a bottom pan of the air-conditioning system housing. In this exemplary embodiment, the individual components of the air-conditioning system 20 have to be installed in the first housing part 108 in the direction of arrow 112, as illustrated in FIG. 9.

The subassembly 10 according to the invention can preferably be produced in the following method steps:

1. Injection-molding the first housing part 18 or 108 and the shell-like duct component 16 connected thereto into a single piece.

2. Fit crossmember 72 into crossmember holder 70.

3. Hook the crossmember 72 into a mounting frame (not illustrated) of the vehicle. In this mounting frame, the crossmember with the first housing part can be brought into any desired position which is convenient for the assembler.

4. Insert the evaporator 26, radiator 32, the air guide flaps 28, 30, 34, 36 and 38 and any additional components, such as, for example, stepping motors, etc. of the heating or air-conditioning system 20, into the first housing part 18 or 108.

5. Place the second housing part 22 or 110 over the assembly to complete the T-shaped structural unit 14.

6. Mount antivibration struts 78 and 80 to the assembly.

7. Fit any further desired functional components, such as side outlets 56 and 58, center outlet 49, operating device 84, radio device 88, airbag 90, instruments 94 and outer tube 96 to the assembly.

8. Test, calibrate and tune the individual components built into or onto the T-shaped structural unit 14.

Following the functional testing, calibrating and tuning the individual components, the subassembly 10 is clad with the decorative parts 60 and 98, which essentially completes the cockpit 12. It should be understood that additional steps may be performed, if desired, such as the addition of storage compartments 114 and 116 to the cockpit 12.

In a further embodiment of the method, the first decorative part 60, which covers the top of the subassembly 10 according to the invention, may be put on during the mounting of the anti-vibration struts 78 and 80 and before the fitting of further functional components as opposed to being fabricated in the final steps. This may be advantageous when functional components, such as for example the instruments 94 or the storage compartments 114 and 116, are also to be connected to the decorative part 60.

It should again be noted that although the invention has been described with specific reference to a motor vehicle cockpit, the invention has broader applicability and may be used in any apparatus cockpit. Similarly, the process described above is but one method of many that could be used. Accordingly, the above description and accompanying drawings are only illustrative of preferred embodiments which can achieve the features and advantages of the present invention. It is not intended that the invention be limited to the embodiments shown and described in detail herein. The invention is only limited by the scope of the following claims.

German Patent Application No. 198 54 940.7 filed on Nov. 27, 1998, including the specification, figures, claims and abstract is expressly incorporated by reference in its entirety.

What is claimed as new and desired to be protected by Letters Patent of the United States is:

1. A subassembly for a cockpit, comprising:
    a heating or air-conditioning housing arranged in a center console, said housing having at least two housing parts;
    at least one air guide duct for guiding air at a controlled temperature to air outlet openings arranged in the cockpit;
    a shell-like duct component formed over said housing; and
    wherein said housing and said shell-like component are formed into a T-shaped structural unit.

2. The subassembly according to claim 1, wherein a first part of said housing and said shell-like duct component are in a single piece.

3. The subassembly according to claim 1, wherein a second housing part can be separated from the first housing part in the direction of the interior of the vehicle.

4. The subassembly according to claim 1, wherein the second housing part forms a bottom pan of the housing.

5. The subassembly according claim 1, wherein the housing parts are held together and reinforced by antivibration struts.

6. The subassembly according to claim 1, wherein the housing and the shell-like duct component are divided, in a parting plane extending transversely with respect to the longitudinal direction of the air guide duct, into a left-hand and a right-hand housing half or air guide duct half, and the left-hand and right-hand housing half, respectively, is in one piece with the left-hand and right-hand air guide duct half.

7. The subassembly according to claim 1, wherein the T-shaped structural unit has a holder for an operating device of the heating or air-conditioning system.

8. The subassembly according to claim 1, wherein the T-shaped structural unit has additional holders for vehicle devices.

9. The subassembly according to claim 8, wherein said vehicle devices include one or more of audio devices, navigation devices and airbag devices.

10. The subassembly according to claim 1, wherein the T-shaped structural unit has at least one crossmember holder for the attachment of a crossmember.

11. The subassembly according to claim 10, wherein the crossmember holder is arranged in the area of the center console.

12. The subassembly according to claim 10, wherein the shell-like duct component can be fixed at its ends to the crossmember.

13. The subassembly according to claim 1, wherein the shell-like duct component has means for fastening vehicle instruments thereto.

14. The subassembly according to claim 13, wherein said vehicle instruments include vehicle monitoring devices.

15. The subassembly according to claim 1, wherein the T-shaped structural unit is plastic.

16. The subassembly according to claim 1, wherein said subassembly is for a motor vehicle.

17. A cockpit comprising:
    a heating or air-conditioning housing arranged in a center console, said housing having at least two housing parts;
    at least one air guide duct for guiding air at a controlled temperature to air outlet openings arranged in the cockpit;
    a shell-like duct component formed over said housing to form the air guide duct, wherein said housing and said shell-like component are formed into a T-shaped structural unit; and
    a first decorative part covering said shell-like duct component to form an air duct.

18. The cockpit according to claim 17, further comprising a second decorative part covering said center console.

19. The cockpit according to claim 17, wherein at least one storage compartment is formed under the shell-like duct component.

20. The cockpit according to claim 17, wherein said cockpit is for use in a motor vehicle.

21. A method of forming a subassembly for a cockpit, comprising:
    forming a first housing part and a shell-like duct component connected thereto in a single piece,
    fitting a crossmember into a crossmember holder in said first housing part;
    hooking the crossmember onto a mounting frame on the vehicle;
    inserting components of a heating or air-conditioning system into the first housing part;
    forming a T-shaped structural unit by connecting a second housing part to said first housing part; and
    mounting at least one antivibration strut to said T-shaped structural member.

22. The method according to claim 21, wherein the first housing part and the shell-like duct component are formed by injection molding.

23. The method according to claim 21, further comprising fitting functional components to said subassembly.

24. The method according to claim 23, wherein said functional components are selected from vehicle monitoring devices, audio/visual devices, instrumentation and airbags.

25. The method according to claim 23, further comprising functional testing and calibrating the individual components.

26. The method according to claim 21, wherein the components of the heating or air-conditioning system include heat exchangers and air guide flaps.

27. The method according to claim 21, further comprising cladding the subassembly with decorative parts.

* * * * *